United States Patent

[11] 3,608,042

| [72] | Inventor | Ole-Bendt Rasmussen |
| | | Topstykket 7, 3460 Birkerod, Denmark |
| [21] | Appl. No. | 733,033 |
| [22] | Filed | May 29, 1968 |
| [45] | Patented | Sept. 21, 1971 |
| [32] | Priority | May 30, 1967 |
| [33] | | Great Britain |
| [31] | | 24837/67 |

[54] PROCESS FOR PRODUCING A FILM OF SPLITFIBRE FORMING POLYMERIC MATERIAL
8 Claims, 1 Drawing Fig.

[52] U.S. Cl. .................................................. 264/177 R,
264/147, 264/210 R, 264/288, 264/DIG. 47
[51] Int. Cl. ........................................................ B29d 7/24,
B29h 7/18, D01d 5/24
[50] Field of Search ............................................ 264/210,
177, 49, 147, 288, 290, 285–7, 209, DIG. 47

[56] References Cited
UNITED STATES PATENTS

| 3,257,488 | 6/1966 | Rasmussen .................... | 264/288 |
| 3,323,978 | 6/1967 | Rasmussen .................... | 264/49 |
| 3,410,933 | 11/1968 | Moseley, Jr. ................. | 264/209 |
| 3,382,305 | 5/1968 | Breen ........................... | 264/171 |

*Primary Examiner*—Robert F. White
*Assistant Examiner*—Jeffery R. Thurlow
*Attorney*—William J. Daniel ABSTRACT: Splitfibre forming polymeric material is extruded through a pleated slot and is then drawn down into flat form while in substantially molten condition so as to produce transverse compression during longitudinal stretching.

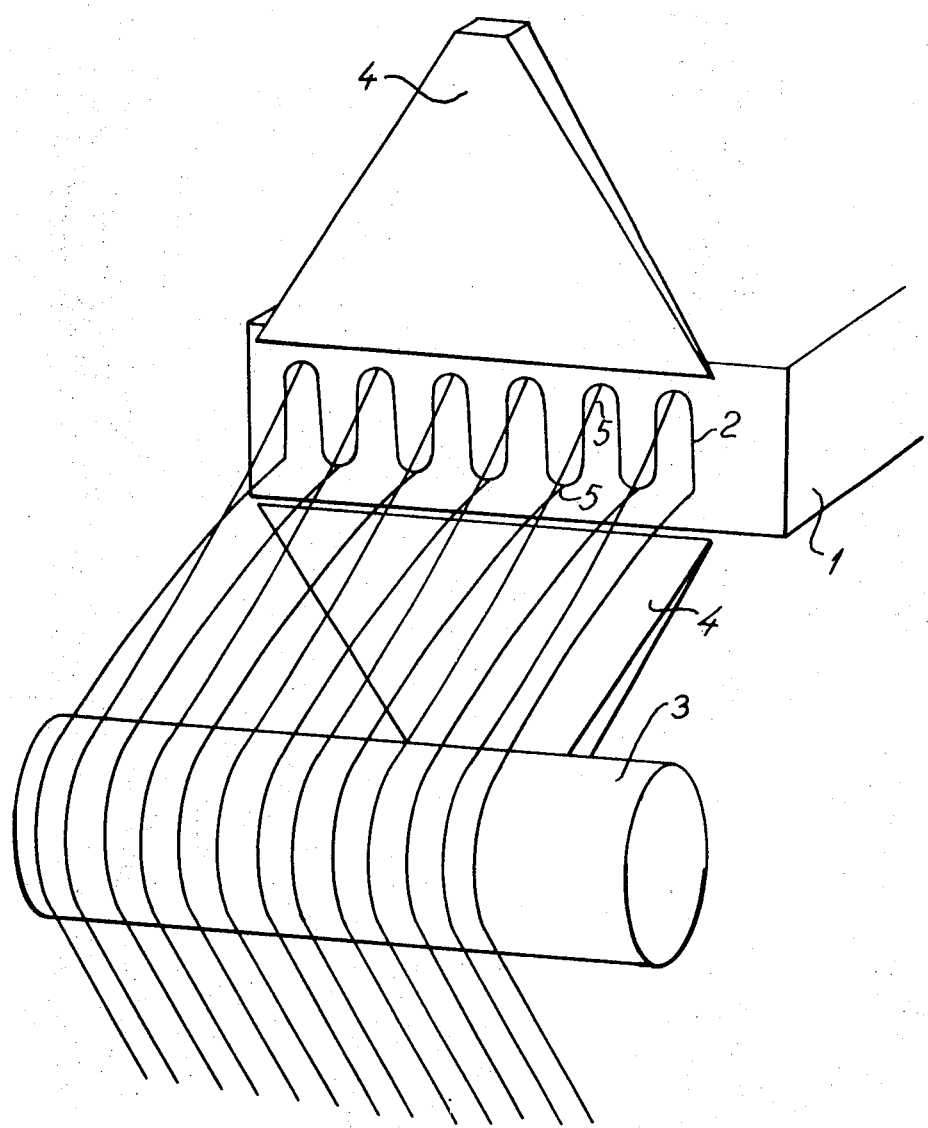

PROCESS FOR PRODUCING A FILM OF SPLITFIBRE FORMING POLYMERIC MATERIAL

BACKGROUND OF THE INVENTION

The present invention relates to improved steps in the process of producing splittable film suitable for the manufacture of splitfibers.

In experiments preceding the present invention it was found that polymer material extruded into the form of wide film by means of usual extrusion equipment obtained a morphology which with respect to splittability was inferior to the morphology obtained by extrusion of narrow ribbons. The differences were explained by the fact that the flat ribbons were relatively free to contract during the haul off from the extrusion die, whereas there is produced a lateral tension by haul off from relatively wide dies, which tension counteracts the contraction of the width of the film and thus acts to produce a less uniaxial morphology of the film. The differences in the morphology were still present when the two samples had been drawn at a temperature below the melting point in order to produce molecular orientation.

SUMMARY OF THE INVENTION

According to the invention, a process for producing a film of splitfiber forming material comprises the steps of extruding splitfiber forming material through a slot of pleated configuration to form a film of pleated cross-sectional shape, and stretching said film, while still in fluid or substantially molten state, into substantially flat cross-sectional shape in a width substantially smaller than the total length of the slot along the pleated configuration thereof, and preferably not exceeding the direct span of the slot.

By using the said extrusion method, the transverse tension during haul off will be reduced to almost zero, thus producing a practically completely uniaxial morphology like the morphology obtained by extrusion of narrow ribbons.

The process steps as described above can with advantage be carried out for production of tubular film by means of a circular die of radially pleated shape.

As employed herein the term "pleating" is intended to mean an undulating or sinuous configuration. The process steps according to the present invention are advantageously applicable to any polymer or polymer mixture of a kind suitable for being converted into fibers by a splitting process such as for example by means of frictional work or lateral drawing, or other methods well known in the art. It is known that some polymers, e.g. high density polyethylene exhibits a relatively high splittability in molecularly oriented state, but this tendency is further increased by use of the present invention, because the splittability has proved to depend not only on the orientation of the molecules, but also on a morphology in the film even being present when plain polymer is used, as there will in practice always exist small inhomogeneities dependent on among other things different molecular weights. By use of the present invention such inhomogeneities will be arranged in a uniaxial manner, hereby improving the splittability.

However, the present invention is with particular advantage carried out on a randomly mixed dispersion of two incompatible polymers, as there is hereby produced a very significant uniaxial morphology. Suitable mixtures of this kind are disclosed in U.S. Pat. application Ser. No. 528,916 filed Feb. 21, 1966, now U.S. Pat. No. 3,499,822, issued on Mar. 10, 1970 copending herewith, dealing with production of crystal whiskers suitable for production of textile materials, and generally produced from mixtures of incompatible polymers.

The present invention is furthermore with particular advantage carried out on polypropylene being mainly isotactic but having also contents of atactic modification of the polymer, as the existence of the said modification also forms certain inhomogeneities which are suitable for formation of a uniaxial morphology.

The pleating ratio, i.e. the ratio between the total length of the extruder lip along the pleated configuration of same and the direct span of the latter (in case of a circular die: the average periphery) should preferably be at a value of above 2:1. A ratio of 3:1 has been found advantageous in most cases, but also rates as high as 4:1–7:1 or even higher may be used. The draw-down ratio in melted or semimelted state, i.e. the proportion between the original thickness and the thickness after stretching in fluid or semifluid state, should preferably be higher than the square of the said pleating ratio.

BRIEF DESCRIPTION OF THE DRAWING

The single FIGURE of the drawing shows in a perspective view diagrammatically an extruder arrangement that may be used for carrying out the invention.

DESCRIPTION OF THE PREFERRED EMBODIMENT

A polymer or polymer mixture is extruded from an extruder die 1 having a pleated slot 2 and hauled off by means of a roller 3. Thus, the film extruded from the slot of the extruder die will first have a pleated cross-sectional shape of substantial uniform thickness, and this film is thereafter hauled off, while still in fluid state, at a draw-down ratio sufficient for converting the film into a state of substantial flatness, the width thereby being reduced to substantially the same value as the direct span of the slot 2 or below the said value. Air cooling is applied from both sides of the film by means of air nozzles 4. In order to demonstrate how the film is converted from the strongly pleated to the flat shape, thin lines 5 are drawn showing the travel of those parts of the film which have been extruded at the turn points of the pleated orifice. It is hereby seen that the film, while being stretched, is subjected to a strong lateral contraction.

When using a noncircular pleated slot it has proved advantageous to keep a relatively short distance between the said slot and the haul-off roller, the said distance preferably being between five and 20 times as great as the depths of the pleats of the slot.

Example

The pleated slot is 0.7 mm. thick, the depth of the pleats is about 18 mm., and the distance between the pleats is 23 mm. Thus, the pleating ratio is 2.1:1. The distance from the pleated slot to the haul-off roller is about 20 cm. The draw-down ratio is about 15:1. Moderate air cooling is applied. The extrusion is carried out with a mixture (49) with 85% polypropylene of melt index 0.3 corresponding to ASTM No. 1238-57T, Condition I, and 15% polystyrene of melt index 5 corresponding to the same specification. The two polymers are first mixed in dry state and then thoroughly worked into each other by means of a so-called planetary screw extruder, from which the melted mixture is supplied directly to a die containing the pleated slot. From this the foil is extruded down onto a roller having a temperature of 135° C.

The finished foil has the following specification:
Thickness: 0.15 mm.,
Width: 78 mm.,
Weight: 9 g./m.

This foil was heat stretched between two sets of rollers having a temperature of 120° C., said rollers forming an angle of 80° with one another. This asymmetric stretching subjects the foil to a transverse compression, while it is at the same time extended 16 times, whereby the molecular structure is oriented in the stretching direction. The stretched foil showed a high splittability, being split up into branched fibers already during stretching. The tear propagation resistance in the direction of orientation of the stretched pleated foil was measured to 1.9 g. and its tensile strength to 41.2 g. per tex.

For comparison, a nonpleated foil was produced by means of a die having a linear slot. This foil was also heat stretched at 120° C., but it could stand no more than a 10 times extension. For this, the tear propagation resistance in the direction of orientation was measured to 7.4 g. and the tensile strength to 40.5 g. per tex.

I claim:

1. A process for producing a film of splitfiber forming material comprising the steps of extruding splitfiber forming polymeric material through a slot of pleated configuration to form a film of pleated cross-sectional shape, and longitudinally stretching said film, while still in substantially molten state, into substantially flat cross-sectional shape having a width substantially smaller than the total length of the slot along the pleated configuration thereof.

2. A process as in claim 1, in which the width of said film upon stretching of same does not exceed the direct span of the slot.

3. A process as in claim 1, in which said slot is circular and constructed with substantially radial pleats.

4. A process as in claim 1, in which said splitfiber forming material is high density polyethylene.

5. A process as in claim 1, in which said splitfiber forming material is a randomly mixed dispersion of two incompatible polymers.

6. A process as in claim 1, in which said splitfiber forming material is polypropylene being mainly isotactic, but also having contents of an atactic modification of the polymer.

7. A process as in claim 1, in which the pleating ratio is at least 2:1.

8. A process as in claim 1, in which the draw-down ratio in said molten state is higher than the square of the pleating ratio.